United States Patent Office 3,399,161
Patented Aug. 27, 1968

3,399,161
PROCESS FOR PREPARING A SOLUTION OF ACRYLONITRILE POLYMERS
Yasushi Ichikawa, Yoshikazu Inai, Katsumi Shirode, and Toshio Ohfuka, Fuji-shi, Japan, assignors to Asahi Kasei Kogyo Kabushiki Kaisha, Osaka, Japan, a corporation of Japan
No Drawing. Filed May 27, 1965, Ser. No. 459,439
Claims priority, application Japan, May 29, 1964, 39/30,056; June 30, 1964, 39/36,486
9 Claims. (Cl. 260—32.4)

ABSTRACT OF THE DISCLOSURE

An acrylonitrile polymer solution is prepared by dissolving an acrylonitrile polymer, an acrylonitrile copolymer or a polymer mixture containing at least 80% by weight of acrylonitrile and 0.01–30% by weight of a stabilizing agent in a nitric acid solvent of 66–75% by weight of nitric acid. The stabilizing agent is carbamic acid, an ester or salt of carbamic acid or a urea derivative.

---

This invention relates to process for preparing a nitric acid solution of acrylonitrile polymers. More particularly, the present invention relates to a process for increasing the whiteness and improving the color characteristics of nitric acid solutions of acrylonitrile polymers and articles produced therefrom. The process comprises adding at least one member selected from the group consisting of compounds having an —NHCO-group in their structure, such as carbamic acid and its derivatives, and urea derivatives to a nitric acid solution of acrylonitrile polymers normally have a tendency to develop color upon application of heat.

There have been several investigations on processes using stabilizing agents for acrylonitrile polymer solutions when an organic solvent of high-polarity is used. However, there has not been found an effective stabilizing agent in the case of nitric acid which is an inorganic acid and a very strong oxidation and nitration agent. The addition of urea and hydrazine salts for removing nitrous acid from nitric acid has been tried and yet is far from satisfactory though it is effective to some extent for increasing the whiteness and thermal stability of said solution and articles produced therefrom.

The present inventors have found that the production of solutions of acrylonitrile polymers and articles produced therefrom having highly improved whiteness and thermal stability can be achieved by adding at least one member selected from the group consisting of compounds having —NHCO—group in their structure, to a nitric acid solution containing acrylonitrile polymers. The stabilizing agents according to the present invention are characterized by the presence of —NHCO— group and include carbamic acid, derivatives thereof, for example, esters such as methyl carbamate and ethyl carbamate, salts such as ammonium, sodium or potassium carbamate, and urea derivatives, for example, hydroxyurea (includes isomer thereof), cyanourea, guaninourea, and hydroxybiuret.

The mechanism of the action of the stabilizing agents on the acrylonitrile polymers in a concentrated nitric acid is not yet definitely ascertained. But, it can sufficiently be understood that the action of these stabilizing agents is not limited only to the removal of nitrous acid from nitric acid, because these agents can yield polymer solutions of high whiteness which can not be obtained from a polymer solution to which has been added the conventional nitrous acid removing agent such as urea and hydrazine and morever can yield polymers of very high whiteness and thermal stability from said solution.

According to the present invention, polymer solutions of very high whiteness can be obtained by adding a nitric acid solvent with 0.01–30 percent by weight of a stabilizing agent based on acrylonitrile polymer. Further, acrylonitrile polymers of very high whiteness and highly improved thermal stability can be obtained from this polymer solution. The stabilizing agent may be used not only alone but also as a combination of two or more.

With regard to the addition of these stabilizing agents, one suitable method is to prepare the polymer solution by previously dissolving the required amount of the stabilizing agent in the appropriate amount of nitric acid solvent and dissolving the acrylonitrile polymer powder therewith. It is also possible to prepare the polymer solution by dissolving in a nitric acid solvent the complete mixture of the acrylonitrile polymer powder and the stabilizing agent in the appropriate ratio. Moreover, the effect of the stabilizing agent according to the present invention is not decreased at all by using the conventional nitrous acid removing agent, for example, urea and hydrazine salts, together therewith.

The nitric acid solvent employed in the present invention is 66–75 percent by weight of nitric acid. For the purpose of the present invention, the contents of nitrous acid in the nitric acid is preferably reduced to less than 0.01 percent by purification. It is desirable to dissolve the polymer below 5° C. The concentration of the polymer to be dissolved is not limited in particular but determined according to the purpose, and is 8–20 percent by weight for general use. In a case where the polymer is regenerated from the polymer solution, the regeneration bath is not limited in particular and it is preferred to use 28–40 percent by weight of nitric acid at a temperature below 5° C.

The term "acrylonitrile polymers," when used herein is intended to include homopolymers and copolymers of acrylonitrile, containing at least 80 percent by weight of acrylonitrile in the polymer molecule, or blends having an overall polymerized or copolymerized acrylonitrile content of at least 80 percent by weight.

The copolymerizable ethylenic unsaturated compounds include acrylic acid, α-chloroacrylic acid, α-bromoacrylic acid, methacrylic acid; acrylates such as methyl methacrylate, methoxy methacrylate, ethyl methacrylate, butyl methacrylate, or methyl acrylate, ethyl acrylate, butyl acrylate, methyl α-chloroacrylate, ethyl α-chloroacrylate, butyl α-chloroacrylate; vinyl chloride, vinyl fluoride, vinyl bromide, vinylidene chloride; methacrylonitrile; acrylamide and methacrylamide; α-chloroacrylamide or lykyl-substituted products thereof; methyl vinyl ketone; vinyl carboxylic acid and vinyl carboxylates, such as vinyl acetate, vinyl chloroacetate, vinyl propionate, vinyl stearate; N-vinylimides, such as N-vinyl phthalimide, N-vinyl succinimide; methylene malonic acid ester, N-vinyl carbazole; vinyl furane; alkyl vinyl esters; vinyl sulfonic acids; ethylene α- β-dicarboxylic acids, anhydrides or derivatives thereof; vinylpyridines such as 2-vinylpyridine, 4-vinylpyridine, 2-methyl-5-vinylpyridine; 1-vinylimidazoles and alkyl-substituted 1-vinylimidazoles, such as 2-, 4-, or 5-methyl-1-vinylimidazole, and other

containing copolymerizable materials.

The polymerization degree of the polymers according to the present invention is not limited in particular but determined according to the intended purpose and for general use is 0.5–10.0 in reduced viscosity ($\eta_{sp./c.}$) measured at 35° C. at a concentration of 2 gr. polymer/100 ml. dimethyl formamide.

Examples are given below for the purpose of illustration only for the effect of the present invention. In the examples, "part" indicates "weight part" whenever no other description in particular is given.

EXAMPLE 1

100 parts of acrylonitrile homopolymer and 0, 0.5, 1 and 2 parts of hydroxyurea were dissolved at 0° C. in 600 parts of purified 70% nitric acid, respectively. By using a 20 mm. cell and nitric acid as a blank solution in the reference cell, the extinctions of these spinning solutions were measured at 420 mµ in a spectrophotometer. The amount of extinction indicates the degree of coloration. The spinning solutions were subjected to extrusion through a 100-hole spinneret into 35% nitric acid. After being washed with water, the yarns were elongated to 7 times their length in boiling water of 100° C., and dried with hot air at 70° C.

The specimen yarns obtained were treated at 135° C. for 10 minutes with superheated steam. The yarn containing 0 part of hydroxyurea corresponds to a null or blank test. The whiteness of these specimen yarns are as shown in the following Table 1. Those were obtained by using a spectrophotometer and calculating the reflection coefficient regarding the whiteness of magnesium oxide as 100.

The tabulated results show the superiority of the present invention wherein hydroxyurea is employed.

TABLE 1

| Hydroxy urea addition (parts) | Extinction Log T | Whiteness | |
|---|---|---|---|
| | | Dry yarn | 130° C. heat-treated yarn |
| 0 | 0.153 | 102 | 83 |
| 0.5 | 0.105 | 109 | 100 |
| 1.0 | 0.095 | 110 | 102 |
| 2.0 | 0.092 | 110 | 104 |

EXAMPLE 2

100 parts of a copolymer consisting of 95 parts of acrylonitrile and 5 parts of methyl acrylate and 0, 0.05, 1, 2 and 5 parts of hydroxy urea were dissolved at 0° C. in 600 parts of purified 70% nitric acid, respectively. The spinning was carried out as in Example 1, and the yarns were dried with hot air at 70° C. Then, the speciment yarns were treated at 135° C. for 10 minutes with superheated steam. The result of the measurement of the whiteness as in Example 1 is given in Table 2.

TABLE 2

| Hydroxy urea addition (parts) | Whiteness | |
|---|---|---|
| | Dry yarn | 135° C. heat-treated yarn |
| 0 | 102 | 72 |
| 0.05 | 108 | 93 |
| 1 | 109 | 98 |
| 2 | 109 | 103 |
| 5 | 110 | 105 |

EXAMPLE 3

100 parts of a copolymer powder consisting of 97 parts of acrylonitrile and 3 parts of acrylic amide and 0, 1 and 5 parts of hydroxy urea were well mixed by a pulverizer and were dissolved at 0° C. in 600 parts of purified 70% nitric acid, respectively. As in Example 1, the spinning was carried out to obtain yarns. Each of the yarns was completely washed with water and elongated to 7 times its length and dried. A part of each yarn was subjected to the treatment with superheated steam at 135° C. for 10 minutes, while another part of each was subjected to dry heat treatment at 180° C. for 10 minutes.

The whiteness of the obtained yarns was measured as in Example 1. The results of the measurements are given in Table 3.

TABLE 3

| Hydroxy urea addition (parts) | Whiteness | | |
|---|---|---|---|
| | Untreated yarn | 135° C. heat-treated yarn | 180° C. heat-treated yarn |
| 0 | 103 | 73 | 63 |
| 0.5 | 109 | 94 | 78 |
| 1.0 | 109 | 100 | 81 |
| 5.0 | 110 | 101 | 83 |

EXAMPLE 4

100 parts of acrylonitrile homoplymer and 0, 0.5, 1 and 2 parts respectively of cyano urea were dissolved in 600 parts of purified 70% nitric acid. These spinning solutions were subjected to extrusion through a 100-hole spinneret into 35% nitric acid, after being washed with water, they were elongated to 7 times their length in boiling water of 100° C., and were dried with hot air of 70° C. The yarns were treated at 135° C. for 10 minutes with superheated steam. The case of 0 part of hydroxy urea corresponds to a null or blank test. The results of the measurements of whiteness made as in Example 1 are as shown in Table 4.

TABLE 4

| Cyano urea addition (parts) | Whiteness | |
|---|---|---|
| | Dry yarn | 135° C. heat-treated yarn |
| 0 | 102 | 83 |
| 0.5 | 108 | 97 |
| 1.0 | 109 | 104 |
| 2.0 | 109 | 105 |

EXAMPLE 5

100 parts of a copolymer consisting of 95 parts of acrylonitrile and 5 parts of methyl acrylate and 1 part of a mixture of equal parts of hydroxyurea and hydroxybiuret were dissolved at 0° C. in 600 parts of purified 70% nitric acid. The spinning was carried out as in Example 1, and the yarn was treated at 135° C. for 10 minutes with superheated steam. The results of the measurements of the whiteness degree as in Example 1 are given in Table 5.

TABLE 5

| Stabilizing agent (part) | Whiteness | |
|---|---|---|
| | Dry yarn | 135° C. heat-treated yarn |
| 1 | 109 | 97 |
| Blank test | 102 | 72 |

EXAMPLE 6

100 parts of acrylonitrile homopolymer mixed with 1 or 5 parts each of the various stabilizing agents as shown in the following table were dissolved at 0° C. in 600 parts of purified 70% nitric acid, regenerated in film form in water and, after being washed with water, dried. Then, the treatment with superheated steam was carried out at 135° C. for 10 minutes. The measurement of the whiteness was made as in Example 1 and the results are as shown in Table 6.

TABLE 6

| Stabilizing agents name and addition | | Whiteness | |
|---|---|---|---|
| | | Dry film | 135° C. heat-treated |
| Ethyl carbamate | 1 part | 109 | 92 |
| | 5 parts | 110 | 103 |
| Ammonium carbamate | 1 part | 110 | 89 |
| | 5 parts | 110 | 104 |
| Guaninourea | 1 part | 108 | 93 |
| | 5 parts | 110 | 105 |
| Hydroxy biuret | 1 part | 107 | 98 |
| | 5 parts | 109 | 104 |
| Blank test | | 102 | 78 |

What is claimed is:

1. A process for preparing an acrylonitrile polymer solution which comprises dissolving an acrylonitrile polymer or copolymer containing at least 80% by weight of acrylonitrile or a polymer mixture containing at least 80% by weight of acrylonitrile and 0.01–30% by weight of at least one stabilizing agent selected from the group consisting of carbamic acid, esters of carbamic acid, salts of carbamic acid, hydroxyurea, cyanourea, guaninourea, and hydroxybiuret in a nitric acid solvent of 66 to 75% by weight of nitric acid.

2. A process as claimed in claim 1 wherein the stabilizing agent is an ester of carbamic acid selected from the group consisting of methyl and ethyl carbamate.

3. A process as claimed in claim 1 wherein the stabilizing agent is a salt of carbamic acid selected from the group consisting of ammonium, sodium and potassium carbamate.

4. A process as claimed in claim 1 wherein the polymer, copolymer or polymer mixture is dissolved at a temperature below 5° C.

5. A process as claimed in claim 1 wheerin the polymer, copolymer or polymer mixture is dissolved in an amount corresponding to a concentration of 8–20% by weight.

6. An acrylonitrile polymer solution comprising an acrylonitrile polymer or copolymer containing at least 80% by weight of acrylonitrile or a polymer mixture containing at least 80% by weight of acrylonitrile, 0.01–30% by weight based on said polymer, copolymer or polymer mixture of a stabilizing agent selected from the group consisting of carbamic acid, esters of carbamic acid, salts of carbamic acid, hydroxyurea, cyanourea, guaninourea, and hydroxybiuret dissolved in a nitric acid solvent of 66–75% by weight of nitric acid.

7. An acrylonitrile polymer solution as claimed in claim 6 wherein the stabilizing agent is an ester of carbamic acid selected from the group consisting of methyl and ethyl carbamate.

8. An acrylonitrile polymer solution as claimed in claim 6 wherein the stabilizing agent is a salt of carbamic acid selected from the group consisting of ammonium, sodium and potassium carbamate.

9. An acrylonitrile polymer solution as claimed in claim 6 wherein 8–20% by weight of the polymer, copolymer or polymer mixture is dissolved.

References Cited
UNITED STATES PATENTS 2,878,220  Holmes et al. _____ 260—32.6
2,735,833  Stanton et al. _____ 260—45.9

ALLAN LIEBERMAN, *Primary Examiner.*

H. S. KAPLAN, *Assistant Examiner.*